(12) United States Patent
Ugon (10) Patent No.: US 7,036,002 B1
(45) Date of Patent: Apr. 25, 2006

(54) SYSTEM AND METHOD FOR USING MULTIPLE WORKING MEMORIES TO IMPROVE MICROPROCESSOR SECURITY

(75) Inventor: Michel Ugon, Maurepas (FR)

(73) Assignee: CP8 Technologies, Louveciennes (FR)

( * ) Notice: Subject to any disclaimer, the term of this patent is extended or adjusted under 35 U.S.C. 154(b) by 0 days.

(21) Appl. No.: 09/242,974

(22) PCT Filed: Jun. 25, 1998

(86) PCT No.: PCT/FR98/01343

§ 371 (c)(1),
(2), (4) Date: Feb. 26, 1999

(87) PCT Pub. No.: WO99/00718

PCT Pub. Date: Jan. 7, 1999

(30) Foreign Application Priority Data

Jun. 26, 1997 (FR) .................................. 97 07995

(51) Int. Cl.
*G06F 7/38* (2006.01)
(52) U.S. Cl. .................................................... 712/228
(58) Field of Classification Search ................ 712/228, 712/218, 244
See application file for complete search history.

(56) References Cited

U.S. PATENT DOCUMENTS

| | | | | |
|---|---|---|---|---|
| 5,012,409 A | * | 4/1991 | Fletcher et al. ............. | 709/103 |
| 5,029,069 A | * | 7/1991 | Sakamura .................... | 712/234 |
| 5,127,098 A | * | 6/1992 | Rosenthal et al. .......... | 711/202 |
| 5,249,294 A | * | 9/1993 | Griffin et al. ............... | 713/200 |
| 5,280,618 A | * | 1/1994 | Takagi ........................ | 710/260 |
| 5,357,617 A | * | 10/1994 | Davis et al. ................. | 712/245 |
| 5,361,337 A | * | 11/1994 | Okin .......................... | 712/228 |
| 5,613,114 A | * | 3/1997 | Anderson et al. ........... | 718/108 |
| 5,694,604 A | * | 12/1997 | Reiffin ........................ | 709/107 |

OTHER PUBLICATIONS

InstantWeb. "On-line Computing Dictionary". http://www.instantweb.com/foldoc/foldoc.cgi?computer+dictionary Search terms: Random Access Memory; Buffer; Random.*

* cited by examiner

*Primary Examiner*—Eddie Chan
*Assistant Examiner*—Aimee Li
(74) *Attorney, Agent, or Firm*—Miles & Stockbridge P.C.; Edward J. Kondracki (57) ABSTRACT

An unpredictable microprocessor or microcomputer comprises a processor (1), a first working memory (51), a main memory (6) containing an operating system, a main program (P1) and a secondary program (P2), a second working memory (52), and switching means which, during the performance of the programs, makes it possible to switch from using one of the two working memories (51, 52) to using the other working memory, while preserving their contents. Switching means comprise at least one first block of registers (54) for storing the operating context of the programs in the main memory and a switching circuit (53) for enabling one of the working memories and the access registers (A1–a3) (d1–d3) associated with each memory (51, 52, 6) and controlled by said switching circuit (53).

30 Claims, 3 Drawing Sheets

SYSTEM AND METHOD FOR USING MULTIPLE WORKING MEMORIES TO IMPROVE MICROPROCESSOR SECURITY

BACKGROUND OF THE INVENTION

1. Field of the Invention

This invention concerns an unpredictable microprocessor or microcomputer.

2. Description of Related Art

It is a known fact that microprocessors or microcomputers execute excessive instructions of a program recorded in memory sequentially in step with one or several timing signals referenced with respect to one of the clock signals supplied to the microprocessor or microcomputer, either internally or externally.

It has proved to be possible to become familiarized with the various phases of this method of program execution as a function of time, because the execution of the instructions is in sequence, to a process predetermined by this program, generally synchronized with the clock signals that regularly time the processor. Indeed, every program generates a sequence of instructions that must be executed successively in an order known in advance, and the moments at which each instruction begins and ends are known accurately, because they are executed to a predetermined process in the course of time. Therefore, in principle, it is possible to know which instruction is performed at a given moment in the processing unit of the processor, because the program that is run comprises a predetermined sequence of instructions.

For instance, it is possible to determine the number of instructions executed as of the startup of the program or of the processing unit, or the time that has elapsed from an event, an external or internal reference signal or, yet again, from the reset of the processor.

This possibility of being able to observe the run-through of a program in a microprocessor or microcomputer is a major drawback when this microprocessor or microcomputer is used in high-security applications. A malevolent person could thus find out the successive states of the processor and use this information to obtain a number of sensitive results regarding internal processing.

For instance, it can be imagined that a given action may occur at different moments depending on the result of a determined security operation such as the testing of internal confidential information or the deciphering of a message or, yet again, the integrity testing of some information. Depending on the moment in question, it might be possible, for example, to act on the processor or to obtain the value of certain registers by physical investigation, and thus obtain information about the result or confidential content of the information and even, in the case of cryptographic calculations, about the secret ciphering key used.

There are devices offering an initial improvement to security microcomputers by equipping them with circuits generating random clock pulses. In this way, the observation of events makes it particularly difficult to carry out investigations because synchronization soon becomes impracticable.

However, this type of solution involves many drawbacks.

First, the design of such circuits is particularly tricky and fastidious because there is no way of simulating random operation throughout as complex a circuit as a microcomputer. It is even more difficult to test the circuits at the end of production in terms of the scrambled behavior thereof. A random sequence of clock pulses is indeed very difficult to simulate for the definition of the circuits, but it is even more difficult to master all the behavior of all the processor logic circuits, in particular during periods of signal switching on the internal busses and in the registers.

That is why an initial improvement, the subject of application Ser. No. 08/945,845 filed by the applicant, filed on Nov. 7, 1997 and entitled "Improved Integrated Circuit And Process For Using An Integrated Circuit", was made to permit the normal operation of the processor during definition and test periods with a customary periodic clock; the processor is capable of itself switching between protected mode or normal mode. To ensure security, it is easy to imagine that the mode could only be activated by the processor on entry of a password or an ad hoc ciphered message.

In addition to these difficulties, there is that of diagnosing failures during sequences under the control of a random clock, i.e., in a totally disordered manner. Indeed, in such disorder, how could a problem be attributed to a faulty part, and how can the exact conditions under which it appears be determined?

It can be seen that the use of a random clock, although it does offer a theoretically interesting improvement, is not a totally satisfactory solution and, above all, is not easy to implement in practice.

SUMMARY OF THE INVENTION

One of the purposes of this invention is to equip the processor with means to inhibit the type of investigation described above and, more generally, to prevent illicit observations of the internal behavior of the processor while using totally controlled standard circuits to permit a simple design and diagnosis of faults by use of conventional methods.

The purpose is achieved by the fact that unpredictable microprocessor or microcomputer, which comprises a processor, an initial working memory, a main memory containing an operating system, a main program and a secondary program, is characterized in that it also has:

A second working memory;

Means of communication which, during the execution of the programs, make it possible, while the programs are running, to switch use as working memory to one of the two working memories to using the other working memory while saving their contents.

These switching means include at least one block of registers storing the context operating of the programs in the main memory and a switching circuit enabling one of the working memories and the access registers associated with each memory and controlled by said switching circuit.

According to another aspect of the invention a second block of registers is provided for storing context for the operating the secondary program.

According to another feature of the invention means of de-correlating the running of the programs from an isochronal clock are provided.

Another purpose of this invention is to ensure that the implementing of said means is assured by the processor itself, so that any additional security created by the above means depends only on a decision of the operating system located in the microcomputer and which is, therefore, unpredictable as regards malevolent action.

The purpose is achieved by the fact that the main program can enable or inhibit the switching mechanisms by loading the circuit 53 for switching and enabling the working memories and the blocks of storage registers associated with each working memory.

According to another particularity, the second working memory and its access registers are substituted for the working memory and its access registers in its utilization by a main program.

A third purpose of this invention is to render the execution time independent of the program itself, but without making it necessary to use clock and random timing signals.

This goal is achieved by the fact that the decorrelation means include a random generator capable of triggering, by means of an interruption circuit, a random interrupt to desynchronize the execution or running of the programs in the processor by random connection to or randomly jumping the secondary program.

According to another particularity, the means of decorrelation include a time counting system independent of processor 1 which, at the end of the time count, triggers an interrupt to return from the secondary program to the main program.

According to another particularity, the means of switching the working memories is controlled either by the processor and the program thereof or by a random interrupt system or a time counter, or by any combination of at least two out of the three.

A fourth purpose of the invention is to avoid register switching from being interpreted as a means of direct or indirect access to sensitive information.

This goal is achieved by the fact that the means of switching of the working memories is confirmed by a change from the processor carrying out a main program sequence.

According to another particularity, the second program uses a working space identical to that of the main program in the main memory.

According to another particularity, the secondary program uses a working space smaller than that of the main program.

According to another particularity, the switching means effects substitution of the working memories and the associated contexts within the execution cycle of a microprocessor instruction.

According to another particularity, the secondary program does not modify the general operating context of the main program so as to allow return to the latter without any need to reestablish the context.

According to another particularity, the context of the main program is reestablished either automatically by the secondary program or automatically by the switching means before control is transferred back or returned to the main program.

According to another particularity, it includes means of substituting the secondary program memory for the main program memory.

According to another characteristic, the main program can use the first working memory and/or the second working memory either alternately or simultaneously.

According to another characteristic, the loading of the switching circuit enables the masking or unmasking of the decorrelation interruptions.

According to another characteristic, return to the main program is carried out by an interrupt triggered by the secondary program after the switching register has been suitably loaded by the execution of an instruction, of the main program or secondary program, to unmask the interrupts.

According to another particularity, it consists of a monolithic integrated circuit.

BRIEF DESCRIPTION OF THE DRAWINGS

Other object and advantages of this invention will become more evident from the reading of the description below referring to the attached illustrations in which.

DESCRIPTION OF THE PREFERRED EMBODIMENT(S)

Figure 1:
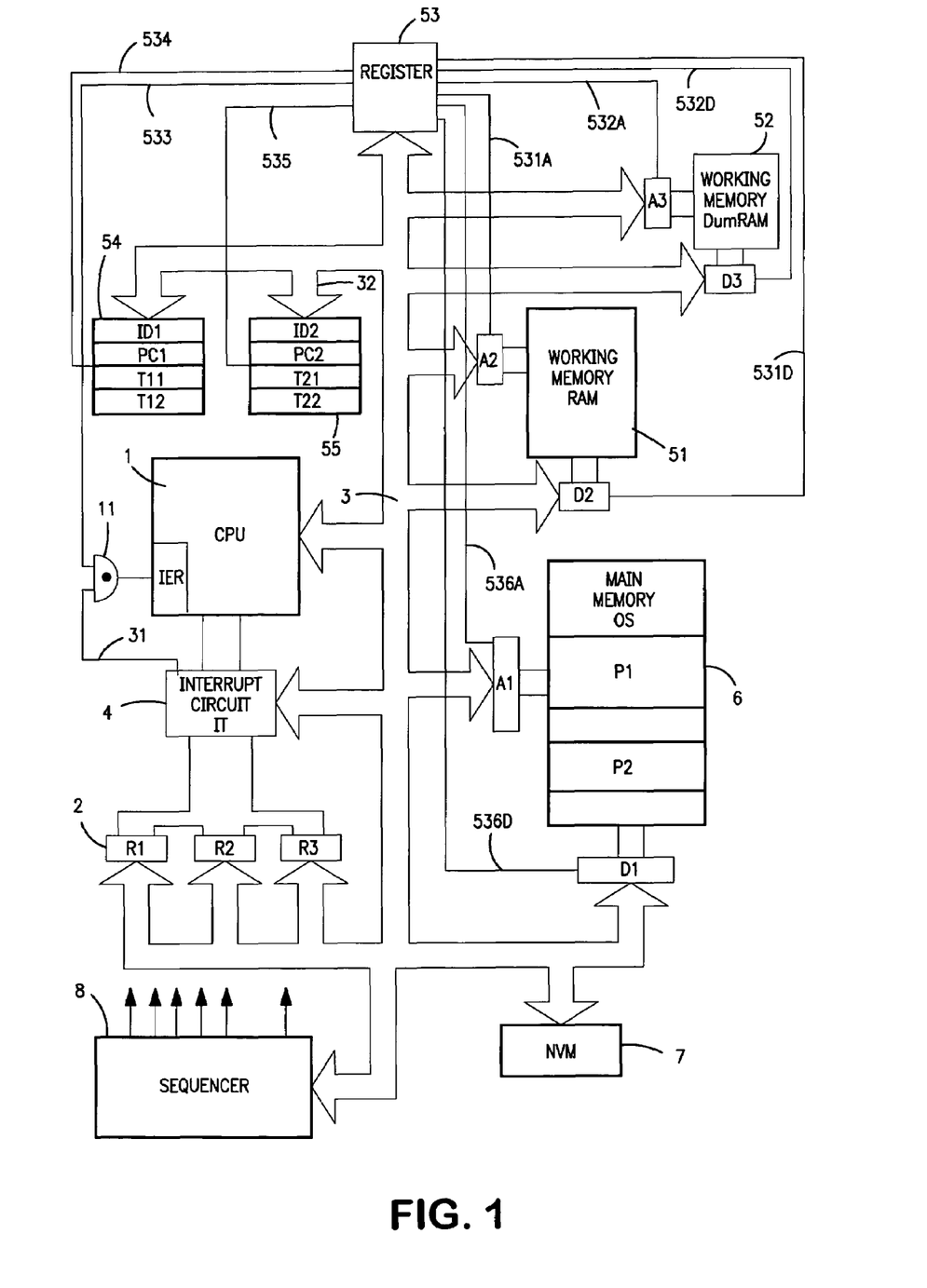
FIG. 1 is an electronic diagram of the integrated circuit according to one embodiment of the invention.

FIG. 1 represents one of the embodiments of the invention. The microprocessor or microcomputer covered by the invention, called the SUMIC (Self-Unpredictable MICrocomputer) comprises a monolithic integrated circuit with a processing unit (1), a non-volatile memory (6) containing the programs to be executed, a RAM (51) with its address registers (A2) and its data registers (D2), as well as a random or pseudo-random signal generator (2) which supplies, for instance, pulses at regular and unpredictable moments, an interrupt circuit (4), a register circuit (R2), a timer (R3), a sequencer circuit (8), a non-volatile memory (7) (NVM), a dummy memory (DumRAM) (52) of the volatile type with its addressing registers (A3) and data registers (D3), two register stacks (54, 55) for memorizing the parameters for return to normal operation and a switching circuit (53) comprising, for example, a register having a sufficient number of cells to check the operation of address registers (A1) and (A3) and data registers (D1) and (D3) and a first block (54) and second block (55) of memorization registers. This switching register (53) is loaded by the processing unit (1) via the bus (3). The state of this switching register (53) is more particularly used for validating the RAM 51 and/or DumRAM 52 in the working memory space of the processor, or outside of this space.

In this monolithic integrated circuit, the processing unit is connected by a bus (3) to the various memories, each going toward a register having respective addresses (A1, A2, A3) and a respective data register (D1, D2, D3), each of which address and data register can be locked by a command line (531 A, 532 A, 536 A), respectively (531 D, 532 D, 536 D) leading out of switching circuit (53). This switching circuit also includes three other command lines, (533–535) one of which (533) terminates at an AND gate (11) with two inputs, the second input of which receives a bus line (31) leading from the interrupt circuit. The output of this AND gate is connected directly to the Interrupt Enable Register (IER) bits to mask the interruption triggered by the interrupt circuit (4), but only when the switching circuit has not been activated and when, accordingly, line (533) is not active.

The two other lines (534, 535) each lock one of the two blocks or stacks or memorization registers (54, 55). Each of these blocks has a number of memorization registers (54) and respectively (55) for the storage of the information which will be described below. These registers (54, 55) are connected to the bus (3) common to the memories. This bus (3) is used for loading the switching circuit (53) with the values needed to render the control lines (531A, 532A, 532D, 536A, 536D, 533, 534, 535) active or inactive depending on the desired operating mode. The non-volatile memory (6) contains the circuit operating system and an initial application program (P1) called subsequently the main program and a second program (P2) called subsequently the secondary program, the sequencer (8), the registers (R2), the timer (R3) and the random generator (R1) also connected to the bus 3 and the three elements (R1, R2, R3) connected to an interrupt generator circuit (4) connected to the processor interrupt inputs (1) using on the Interrupt Enable Register (IER) of the processor, one of the bits which is generally reserved and available for applications specific to some users.

In an initial embodiment, main program (P1) contained in the non-volatile memory (6) modifies as necessary the state of switching circuit (53) through bus (3), a process that does not represent any difficulties in execution. Momentarily, this switches out the main working RAM (51) or part of this memory by acting on the CE (Chip Enable) input validating a memory package and all the registers needed for the first block (54) for return to normal operation. These memories and registers can be advantageously of the static type so as to save on the energy needed for maintaining them. The switching circuit (53), therefore, replaces the dummy memory (52) for the main working memory (51) so that the programs are executed using exclusively the dummy memory instead of the main working memory. Said dummy memory (52) can be at the same addresses as the memory for which it is replaced but can also be at a different address. One advantageous and economical solution consists in using a very small RAM for this dummy memory. Indeed, this dummy memory does not play a functional part for the main program, and the addressable space can be restricted by simply decreasing the length of the addressing register (A3). It is also possible to "fold back" the address on itself by setting up an Exclusive OR between several address register blocks. Thus, if the addressable space of the main working memory is 512 bytes, the dummy memory can be restricted to 32 bytes without difficulty, thus leading to a very economical solution. The 32 bytes can correspond, for instance, to the simple addition of a RAM memory line to the matrix of the main working memory. In this case, this line will have its own address registers (A3) and data registers (D3). Then the switching circuit (53) activates the dummy memory, it can inhibit any write access to the NVM so as not to disturb its content.

To carry out the switching, it is sometimes advantageous to use two blocks of registers alternately, a first block (54) and a second block (55), each containing the entire context needed for executing the program and, more particularly, the program counters respectively (PC1) for the first block (54) and (PC2) for the second block (55), the instruction decoding registers (D1) for the first and (D2) for the second, and other registers symbolized by (T11, T12 and T21, T22). The latter registers (T11, T12, T21 and T22) preserve the same operating parameters such as, for example, the machine cycle number to be used. All these registers are switched automatically by switching circuit (53). The change of address is carried out instantly in this case without there being any obligation, as in the case of most micro-calculators, to save the content of the program counter in a register stack using a specific instruction. Thus, switching in both directions is very fast (generally much shorter than a clock cycle), considerably increasing the security level of the device. The same mechanism can be used for the other registers which save the operating context of the processor, like (T11 to T22).

It should be understood that when program (P1) activates the operation of the integrated circuit in the dummy mode by loading the switching register, the switching circuit (53) will inhibit the first stack of registers (54) which preserves the parameters prior to the dummy circuit operation to restart it where the program (P1) has been interrupted. On the other hand, the second stack of registers (55) will be used to enable normal operation of the circuit with the same dummy memory to execute program (P2). It is also evident that, in this case, the interrupt masking IER register bit corresponding to operation in the dummy mode will have been unmasked so as to enable, during the generation of an interrupt either by the random generator or by the timer (R3) previously loaded by the random generator with a random number, and at the end of the run-through of the time represented by this number, or by register (R2) loaded with specific information, triggering the interruption, (31) causing changeover from normal operation under control of program (P1) to operation in the dummy mode under the control of program (P2).

Figure 2:
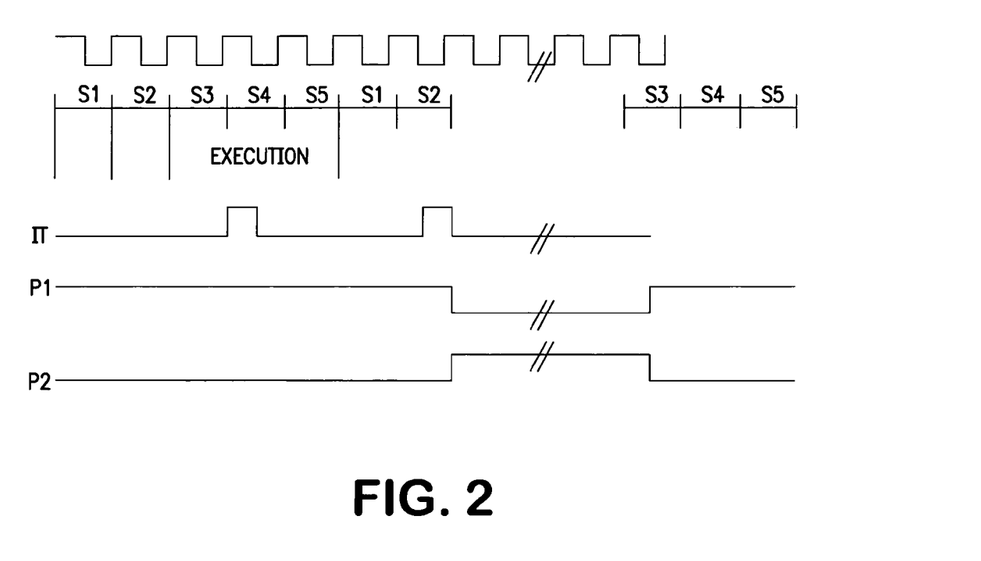
FIG. 2 is the timing diagram of the execution of instructions on appearance of interruptions and acknowledgment of an unmasked interrupt.

FIG. 2 illustrates operation in the interrupt mode. The diagram shows that the first interrupt pulse IT, transmitted by the interrupt circuit on line (31) toward the processing unit (1), is not taken into consideration because it was masked by means of the register and the interrupt masking using the instructions "MOVE immediate data to register IER" so as to load the data into the masking register. It is assumed that the current instruction unmasks the diversion interruption (but this can be done by any other instruction at a different time). In this case, the second pulse is considered by the processing unit (1) causing the switching circuit (53) to switch over and, accordingly, the second block of registers (55) and the DumRAM (52) become active instead of the first block (54) and the main working memory (51). It is to be noted that the acknowledging of the interruption is only possible during the transition from one state to another, for instance between (S2) and (S3) so as to memorize a stable and consistent state of the machine and, above all, to restore exactly the same state when the interrupted program returns. If this interruption is acknowledged, as is the habitual case at the end of an instruction, there is no particular problem when the interrupted program is recovered because it takes place normally on the next instruction. Conversely, if the interruption occurs during the execution of an instruction, for example in state (S2), it is obviously necessary for the sequencing circuits to be reestablished identically so as to correctly trigger the state (S3) on recovery of the interrupted program. This can be achieved, for instance, by a direct link between the register (T11) and the sequencer (8) via bus (3) at the moment of recovery. This link can also be specific without going via the bus (3. It might also be advantageous to include the status memorization registers in the sequencer itself to avoid the mobilization of the bus during this phase.

In this way, by means of an interruption, the main program (P1) can enable and/or switching to a secondary program (P2) as described below. When the secondary program is no longer active, the state of switching circuit (53) changes and the RAM working memory regains its initial configuration without any modification so that the main program can recover its course exactly at the point it was interrupted. It can also be carried out in such a way that when the main program (P1) needs to be protected, by its own diversion of a secondary program (P2), it trips and generates a random length at moments chosen by it, either at the beginning or during the processing, so as to scramble the different sequences. The operation of the process can then be controlled by the secondary program (P2) which, for example, can trigger a waiting loop of which the length of time depends on a random number derived from the generator (2). The secondary program can be executed using the parts of the memory unused by the main program so that the latter can resume its normal process as soon as the secondary program transmits the new control to it, or yet again, on the next interruption, or once again, using the timer as previously, or using a combination of the two. The secondary program can also use the shared resources as long as it reestablishes the context of the main program before transferring control back to it.

It might be tempting to say that these mechanisms are similar to the execution of the branching of the main program towards a secondary program with return at the end of the execution of the latter but that of the invention is particularly different:
- the secondary program does not execute any function mandatorily related to the main program,
- the size of the dummy memory (52) can be much smaller than needed for the normal run-through of a program
- the content of the dummy memory (52) is of no importance because it simply covers the tracks
- with this fast mechanism, it is possible to interlace the instructions of the secondary program with those of the main program
- there is no need to save the context of the secondary program because the latter is used simply for covering tracks.

In a second embodiment, when the processor switches the circuit (53) at the same time, it activates a timer (R3) initialized either by random generator (2) or from the content of non-volatile memory NVM (7). Said NVM of the E2 PROM type, for instance, or a ferro-electric unit, can indeed contain a single number modified each time the NVM is used. When the timer (R3) expires, after an unpredictable period of time, it triggers return to the main program and also switches the switching circuit (53) to bring the main memory back into the working space. This mechanism can be executed either by a conventional interruption or by direct action of the timer (R3) on the switching circuit (53) and by action on registers (PC1) and (PC2), checking the execution of the programs by the processing unit (1) such as (PC1) and (PC2).

In an alternative embodiment, it is possible to use as secondary program (P2), any part of main program (P1) initially pointing to an address chosen at random then inverting the bytes obtained from the address and or inverting, for example, the content of register (ID2) by reverse cabling or by a left shift circuit for the content of an address. In this way, we can also be assured that the program will execute totally outlandish instructions.

Figure 3A:
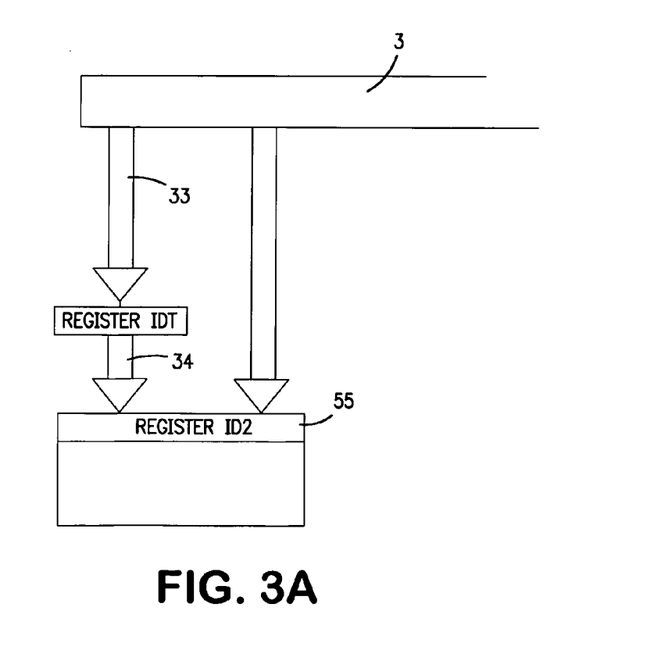
FIG. 3 represents an alternative design of the loading circuit of one of the integrated circuit memorization registers.
Figure 3B:
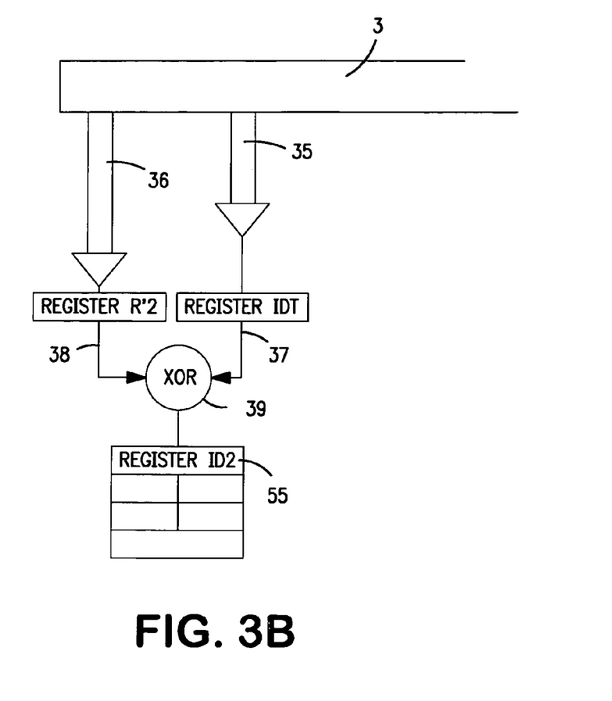

Another alternative for the execution of outlandish instructions can be that provided in FIG. 3 wherein a register decoding temporary instructions IDT is connected, on the one hand, to the bus (3) by a portion of bus (33) and, on the other hand, to the second stack of registers (55) enabling the memorizing of the circuit states by a portion of the bus (34). The portion of bus (34) is connected by hardware to register (ID2) of stack (55) by specific cabling connecting bit (B7) of register IDT to bit (B4) of register (ID2), bit (B6) of register IDT to bit (B1) of register (ID2), bit (B5) of register IDT to bit (B3) of register (ID2), etc.

Finally, a final alternative allows the execution (of instructions) that are totally outlandish and comprises and embodiment as depicted in FIG. 3 in which the bus (3) is connected by a portion of bus (35) to the IDT temporary instructions decoding register. Another portion (37) of the bus connects this IDT register to an exclusive OR gate (39) with several inputs. The other inputs of this OR gate are connected by a bus (38) to a register (R'2) loaded with a portion (36) of the bus bringing it into relation with bus (3). This register (R'2) can be loaded with any information such as that obtained from a random generator (R1) or a timer or a non-volatile memory NVM (7) by an instruction such as "MOVE register (R1) (for instance) to register (R'2)". This type of shift instruction is well known to the man of the art in the field of microprocessors and does not involve any difficulties of implementation. The exclusive OR between the information from register (R'2) and the values loaded into the IDT register are a way of totally modifying the program instructions (P2) and, thus, executing totally outlandish instructions.

It is possible to use in the program (P2), a multitude of sequences which will be called in a random manner and each of the sequences will implement a set of different instructions entailing a variable processing time in each branch and different microprocessor behaviors. The sequences can be called at random, for instance after the main program has carried out the jump to the secondary program, the latter of which loads a random value V from memory (7) into two registers, for example (T21) and (T22) of microprocessor (1). The secondary program increments this value V then the program commands the memorizing of this value, incremented in non-volatile memory (7). This value, memorized in the non-volatile memory (7) is designed for subsequent use. The secondary program then samples n MSBs or LSBs in (T21) to obtain a value r making it possible to designate the program sequence to be executed from the various secondary program sequences.

In a third embodiment, the random generator (2) can be interrogated by the processor (1) via the bus (3) by a read instruction in order to find out its status, or by directly reading a determined pulse or by grouping several of them or yet again by considering the content of register (R2) loaded from random generator 9 (2). When the main program needs protection, it transfers control to the secondary program in a similar way to the mechanism seen previously.

Naturally, it is possible to combine the effects of the previous embodiments by having, on the one hand, a random clock and, on the other, the possibility of interrupting the run-through of the main program either by itself or by a random interruption system which it either authorizes or not.

It is also evident that the run-through of the main program is accomplished according to absolutely unpredictable sequencing which depends either on the random generator or on the program or on the timer or on the secondary program or on two, three or four elements at a time. When the main program executes functions that are not sensitive from the security point of view, it can also have recourse to normal operation for instance, to supply results to the outside world or to mask the timer (R3) or random generator (2) decorrelation interruptions and, thus, optimize the processing time. As soon as a security function is implemented, the principal program (P1) enables operation in the random mode by validating the decorrelation interruptions so as to "scramble" the operation.

A fourth embodiment also illustrated in FIG. 1 allows the use of RAMs (51) and (52) simultaneously. Indeed, if it is assumed that it is possible to detect the switching of the memories and the associated registers, it might be possible to carry out analyses by eliminating the sequences using the dummy memory (52). To avoid this eventuality, this embodiment means that the memories (51) and (52) can be validated in parallel during an initial phase. Obviously, this presupposes that memory (52) in the case at hand, has a size equal to at least that of the zone used by program (P1) in memory (51) when working with the latter. In this way, the content of the two memory zones used by program (P1) respectively in memories (51) and (52) are initialized and used by this program in an identical manner during this first phase. One alternative may consist in validating by loading switching circuit (53) with the necessary configuration only one of the two registers (D2) or (D3) during the read cycles to prevent any conflicts but this does not make any fundamental change to the invention. Therefore, we cannot distinguish which memory is really used during this phase. Accordingly, during a second phase, it becomes possible to switch the memories alternately and randomly by means of modifications to switching circuit (53) while continuing to execute the same program (P1). Therefore, it will no longer be possible to correlate the execution of one program or another with the RAM or with the registers used. In a third phase, we will switch to the dummy memory (52) via program (P2) as described previously at unpredictable moments while return to the main working memory (51) will also take place at unpredictable moments and the process will be reproducible at will under the control of the main program (T1) as a protective measure.

Figure 4:
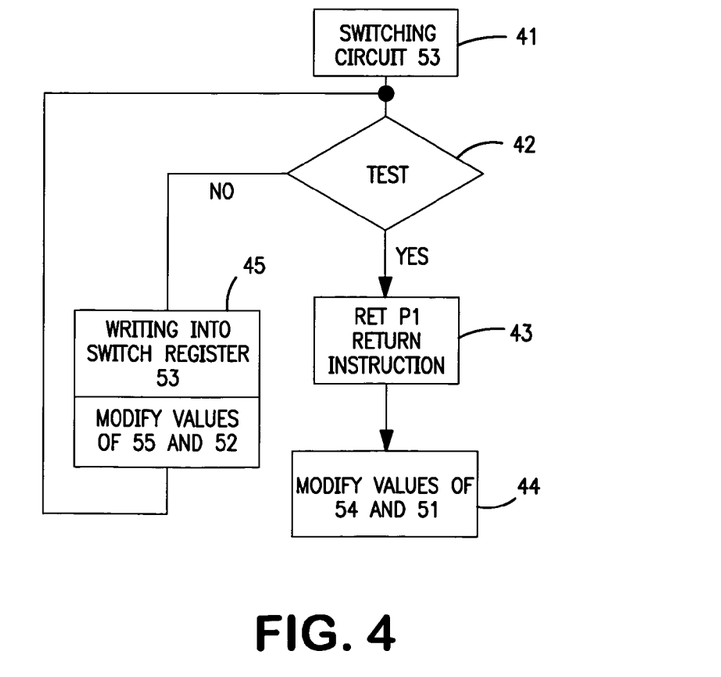
FIG. 4 represents the logic diagram of the program part (P2) enabling the return to normal operation of the circuit.

Finally, the last program raised by the invention is that of being able to exit from the dummy mode of the program (P2) and return to the normal operating mode with program (P1). Just before transferring control to program (P2), program (P1) will enable interruptions coming either from the random generator or from the timer while initializing the latter. During the run-through of anarchical program (P2), an interruption via the circuit (4) occurs which transfers to the interruption program (PIT). This program, accessed conventionally by means of an interruption vector, analyzes the execution context of the current program, for example. If (P2) is active, PIT transfers control to program (P1). This mechanism can be performed as follows: when the first instructions of the PIT program are executed, it can be made up, for instance, as shown in FIG. 4, by the reading (41) of the content of the switching circuit (53), then a test (42) to determine whether the information contained in circuit (53) corresponds to dummy mode operation. In the affirmative, the PIT program executes a program return instruction (P1) represented by Step (43). This return is initiated by the writing of switching register (53) according to Step (44) which consists in modifying the values of the lines (534) and (531). This subsequent writing (44) into the switching register (53) makes it possible to return to the normal modified mode of line values (534) and of line (531) so as to authorize the use of the stack (54) and of main working memory (51) once again. This instruction for return to program (P1) can be executed directly after dummy test (42) or after the execution of a number of other instructions that are not represented and which make it possible to generate a random time. If test (42) is negative, the program continues to Step (45) by writing into the switching register (53) to change over to the dummy mode so as to modify the values of lines (535) and (532) to enable the use of register stack (55) and of the dummy memory while locking the circuits under control by (531) and (534).

It will be noted that, in all said embodiments, there is no need to use a random clock. To the contrary, clock distribution can remain totally conventional and isochronal to provide easy design of the circuits and the simulation and testing thereof. In reality, security is no longer due to the fact that the processor is timed at random but rather due to the execution as such of these programs in step or not in step with an isochronal clock; execution itself is scrambled.

The organization of the programs executed by the processor can be accomplished in such a way that the operation of the processor is controlled by a real security operation system deciding on the type of jamming to be implemented according to the type of program executed by the machine. In this case, the operating system manages, as it deems fit, the various signals coming in from the random generator, the interruptions and the launching of the main and secondary programs. Obviously, the secondary program can be used to carry out other functions than a simple waiting loop, in particular processing that can be effective for the main program so as to take advantage of the time devoted to the secondary program. This processing can comprise, for example, preparatory calculations used subsequently by the main program. Naturally, it is easy to generalize the mechanisms of the invention when the processor operates in a multi-application mode while the application programs can then be considered as simple main programs.

The random generator and timer mentioned above do not cause any particular problems in production and are known to the man of the art when used separately for other uses having no tie with this invention.

For the random generator, it is possible, for instance, to use looped counters having different periods. These counters are initialized by initialization information stored in the non-volatile memory (7). When the processor starts, the counters take the value stored as initial value into consideration. During calculation or at the end, z, the non-volatile memory is updated with a new value used as initialization information to initialize the counters on the next initialization. The generation of the interruption pulses mentioned above can then occur when the generated number has characteristics such as equality with some of the program data. It is also possible to use the value of one or several bits of one or several counters. It is also possible to produce a very good random generator using a cryptographic algorithm or a chopping function initialized by the initialization information mentioned above. In this case, the generator can be a program implementing the algorithm. It is evident that this random number generator can also be used to generate a variety of random numbers as mentioned above. Another way of producing a generator like this is to amplify the voltage generated across the terminals of the "noise diode" and to shape the signals after low-pass filtering to ensure that excessively fast noise pulses do not interfere with the operation of the microprocessor.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

The invention claimed is:

1. An unpredictable microprocessor or microcomputer comprising:
   three distinct locations each for receiving memory;
   in a first location, a main memory including an operating system, a main program, and a secondary program, wherein said secondary program is not related to the main program;
   in a second location, a first RAM-type working memory;
   in a third location, a second RAM-type working memory;

a processor adapted to execute instructions from one or more of said main memory, said first working memory and said second working memory;

a bus connecting the processor to the main memory, the first working memory and the second working memory;

switching means for making said processor unpredictable, said switching means unpredictably jumping, while the programs are running, from one of the two working memories to the other working memory while saving the contents of the two working memories, said switching means comprising:

access registers associated with each of the main memory, the first working memory and the second working memory;

at least one first block of registers that stores the operating context of the programs in the main memory; and a switching circuit that enables one of the working memories and controls the access registers associated with each of the main memory, the first working memory and the second working memory.

2. The unpredictable microprocessor or microcomputer according to claim 1, further comprising a second block of registers for storing the operating context of the secondary program.

3. The microprocessor or microcomputer according to claim 2, wherein the main program can enable or inhibit the switching means by loading the switching circuit to switch and enable the working memories and the first block and second block of storage registers associated with each respective working memory, and storing, respectively, the operating context of the programs in the main memory and the operating context of the secondary program.

4. The unpredictable microprocessor or microcomputer according to claim 3, further including means for de-correlating the running of the programs from an isochronous clock, wherein the de-correlating means comprises a time counting system independent from the processor that, after the time count, triggers an interrupt for returning from the secondary program to the main program.

5. The unpredictable microprocessor or microcomputer according to claim 4, wherein the switching means is controlled, either by one of the microprocessors and the program thereof, the random interruption system, a time counter, or by a combination of at least two out of the three named elements.

6. The unpredictable microprocessor or microcomputer according to claim 4, wherein the de-correlation means include a time counting system independent of the processor for enabling, at the end of a time count, the triggering of the random interrupt to return from the secondary program to the main program, and the switching means is controlled by one of the microprocessors and the program thereof, the random interruption system, a time counter or by a combination of at least two of the three named elements.

7. The unpredictable microprocessor or microcomputer according to claim 3, further including means for dc-correlating the running of the program from an isochronous clock, wherein the switching means is controlled by the processor and its program, by the de-correlating means, by a timer, or by any combination of at least two of the three named elements.

8. The unpredictable microprocessor or microcomputer according to claim 1, wherein loading of the switching circuit makes it possible to mask or unmask dc-correlating interrupts.

9. The unpredictable microprocessor or microcomputer according to claim 2, further including means of de-correlating the run-through of the programs with respect to an isochronal clock.

10. The unpredictable microprocessor or microcomputer according to claim 2, wherein the second working memory and the associated access registers of the second working memory are adapted to be replaced in the use thereof by a main program, with said first memory and the associated access registers of the first memory.

11. The unpredictable microprocessor or microcomputer according to claim 2, wherein the switching means is confirmed by loading from the processor executing a main program sequence.

12. The unpredictable microprocessor or microcomputer according to claim 1, further including means for de-correlating the running of the programs from an isochronous clock.

13. The unpredictable microprocessor or microcomputer according to claim 12, wherein the de-correlating means comprise a random number generator for triggering, via an interrupt circuit, a random interrupt for desynchronizing the running of the programs in the processor, by unpredictably jumping to the secondary program.

14. The unpredictable microprocessor or microcomputer, according to claim 13, wherein an interrupt triggered by the secondary program effects return to the main program after the switching register has been properly loaded, by executing an instruction of the main program or the secondary program, in order to unmask the interrupts.

15. The unpredictable microprocessor or microcomputer according to claim 13, wherein the de-correlation means include a time counting system independent of the processor for enabling, at the end of a time count, an interruption trigger to return from the secondary program to the main program.

16. The unpredictable microprocessor or microcomputer according to claim 13, wherein the switching means is controlled, either by one of the microprocessors and the program thereof, the random interruption system, a time counter, or a combination of at least two out of the three named elements.

17. The unpredictable microprocessor or microcomputer according to claim 13, wherein the interrupt circuit triggers the random number generator to thereby trigger the random interrupt to desynchronize execution of the programs in the processor, by random connection to the secondary program.

18. The unpredictable microprocessor or microcomputer according to claim 12, wherein the de-correlating means comprise a random generator.

19. The unpredictable microprocessor or microcomputer according to claim 12, wherein the main program is adapted to enable or inhibit the switching means by loading the switching circuit of working memories and of the memorization register blocks associated with each respective working memory.

20. The unpredictable microprocessor or microcomputer according to claim 12, wherein the second working memory and the associated access registers of the second working memory are adapted to be replaced in the use thereof by the main program, with said first working memory and the associated access registers of the first working memory.

21. The unpredictable microprocessor or microcomputer according to claim 1, wherein the second working memory and its access registers are substituted for the first working memory and its access registers in utilization by the main program.

22. The unpredictable microprocessor or microcomputer according to claim 1, wherein the switching means is enabled by being loaded by the processor running a sequence in the main program.

23. The unpredictable microprocessor or microcomputer according to claim 1, wherein the secondary program uses a working space identical to that of the main program in the main memory.

24. The unpredictable microprocessor or microcomputer according to claim 1, wherein the secondary program uses a working space smaller than that of the main program.

25. The unpredictable microprocessor or microcomputer according to claim 1, wherein the switching means carry out the substitution of the memories and the associated contexts within the execution cycle of an instruction from the microprocessor.

26. The unpredictable microprocessor or microcomputer according to claim 1, wherein the secondary program does not modify the general operating context of the main program in order to allow the main program to return without having to reestablish said context.

27. The unpredictable microprocessor or microcomputer according to claim 1, wherein the context of the main program is reestablished either automatically by the secondary program or automatically by the switching means before returning control to the main program.

28. The unpredictable microprocessor or microcomputer according to claim 1, further comprising means for substituting the memory of the secondary program for the memory of the main program.

29. The unpredictable microprocessor or microcomputer according to claim 1, wherein the main program can use the first working memory and the second working memory alternately or simultaneously.

30. The unpredictable microprocessor microcomputer, according to claim 1, wherein the microprocessor or microcomputer is embodied in a monolithic integrated circuit.

* * * * *

UNITED STATES PATENT AND TRADEMARK OFFICE
CERTIFICATE OF CORRECTION

PATENT NO. : 7,036,002 B1 Page 1 of 1
APPLICATION NO. : 09/242974
DATED : April 25, 2006
INVENTOR(S) : Ugon, Michel It is certified that error appears in the above-identified patent and that said Letters Patent is hereby corrected as shown below:

Column 11, Line 65, please delete "claim 1" and replace with --claim 3--.

Signed and Sealed this

First Day of August, 2006

JON W. DUDAS
*Director of the United States Patent and Trademark Office*